United States Patent
Cassone

(10) Patent No.: US 8,197,873 B2
(45) Date of Patent: Jun. 12, 2012

(54) ACOUSTICALLY-TREATED FOOD AND METHOD FOR FLAVOR ENHANCEMENT

(75) Inventor: Alphonse Cassone, Las Vegas, NV (US)

(73) Assignee: James McCall, Las Vegas, CA (US)

( * ) Notice: Subject to any disclaimer, the term of this patent is extended or adjusted under 35 U.S.C. 154(b) by 1274 days.

(21) Appl. No.: 11/482,652

(22) Filed: Jul. 7, 2006

(65) Prior Publication Data

US 2008/0008796 A1 Jan. 10, 2008

(51) Int. Cl.
*A23L 1/025* (2006.01)
*A23L 3/30* (2006.01)
(52) U.S. Cl. .................. 426/238; 426/234; 426/237
(58) Field of Classification Search .................. 426/237, 426/537, 665, 238, 549
See application file for complete search history.

(56) References Cited

U.S. PATENT DOCUMENTS

| | | | |
|---|---|---|---|
| 2,496,557 A | 2/1950 | Nordenskjold et al. | |
| 2,881,079 A | 4/1959 | Simjian | |
| 2,980,537 A | 4/1961 | Hagen | |
| 3,456,715 A * | 7/1969 | Freedman et al. | 164/151.3 |
| 4,208,915 A * | 6/1980 | Edwards | 73/620 |
| 4,504,498 A * | 3/1985 | Kissam | 426/238 |
| 5,037,208 A * | 8/1991 | Dussault et al. | 366/127 |
| 5,132,942 A * | 7/1992 | Cassone | 367/159 |
| 5,927,304 A * | 7/1999 | Wen | 134/153 |
| 6,185,865 B1 * | 2/2001 | Soll et al. | 47/61 |

FOREIGN PATENT DOCUMENTS

| | | |
|---|---|---|
| DE | 195 09 857 A1 | 9/1995 |
| EP | 0 477 774 A | 4/1992 |
| FR | 2744140 A1 * | 8/1997 |
| GB | 634 124 A | 3/1950 |
| SU | 960 247 A1 | 9/1983 |

OTHER PUBLICATIONS

NOAA Coastal Services Center, "Single Beam Acoustic Sensors", Nov. 2003, retrieved from the internet: URL: http://web.archive.org/web/20031110171359/http://www.csc.noaa.gov/crs/rs_apps/sensors/single_beam.htm.*
Dieter, Machine Translation of FR 2744140, Aug. 1997.*
Raymarine, Inc., "Transducers for Fishfinders Owners Handbook," Aug. 2002, Raymarine, Inc., pp. 31-33.*

* cited by examiner

*Primary Examiner* — Humera Sheikh
*Assistant Examiner* — Tynesha McClain-Coleman
(74) *Attorney, Agent, or Firm* — Weiss & Moy, P.C.; Jeffrey D. Moy

(57) ABSTRACT

A method of enhancing the flavor of food by exposing the food to acoustic waves from a low frequency sonic transducer immersed in liquid is provided. The liquid may be the food itself and/or the food may be positioned within a range between about ¼ inch and about 20 feet from the liquid-containing container, and is preferably exposed to waves at a frequency ranging between about 1 Hertz to about 1000 Hertz, optimally 600 Hz for approximately one minute to 24 hours, optimally about 30 minutes. The acoustically-treated food is also provided.

6 Claims, 2 Drawing Sheets

ACOUSTICALLY-TREATED FOOD AND METHOD FOR FLAVOR ENHANCEMENT

FIELD OF THE INVENTION

This invention relates generally to flavor enhancement for food. More specifically, this invention relates to acoustically treated food and a method for treating the food with acoustic waves to enhance its flavor.

BACKGROUND OF THE INVENTION

Flavor is the sensory impression of a food or other substance, and is determined mainly by the chemical senses of taste and smell. The "trigeminal senses," which detect chemical irritants in the mouth and throat, may also occasionally determine flavor. The flavor of the food or other substance, as such, can be altered with natural or artificial flavorants or flavor enhancers which affect these senses.

Flavor enhancers are focused on altering or enhancing the flavors of natural food products, or creating flavor for food products that do not have the desired flavors such as candies and other snacks. Most types of flavorants or flavor enhancers are focused on taste and smell. Few commercial products exist to stimulate the trigeminal senses, since these are sharp, astringent, and typically unpleasant flavors.

The most well known flavor enhancer is Monosodium Glutamate, which is used widely in processed foods. It is used to restore food flavor lost during food processing and to give flavor to bland foods. It stimulates the tongue's taste buds and accentuates the aroma and taste of the base ingredients used in food applications. Flavor Enhancers may refine, brighten, accentuate, and naturally enhance key flavor notes. Unfortunately, monosodium glutamate and other flavor enhancers may pose health concerns and other problems in sensitive individuals.

In U.S. Pat. No. 5,132,942, issued to applicant herein, a low frequency electroacoustic transducer (the "Cassone Transducer") is disclosed. According to U.S. Pat. No. 5,132,942, the Cassone Transducer could be used to efficiently disperse emulsions, chemical and other wastes, and the like for recycling and environmental enhancement. In subsequently issued U.S. Pat. No. 6,500,134 to Cassone, it is disclosed that the Cassone Transducer may be used to treat circulatory disorders. In application Ser. No. 10/166,749 (Published as 20020151828 on Oct. 17, 2002) to Cassone, it is disclosed that the Cassone Transducer may be used to treat certain blood-manifested medical disorders. These related patents, U.S. Pat. Nos. 5,132,942 and 6,500,134 and application Ser. No. 10/166,749 by the same named inventor are herein incorporated by reference in their entirety. None of these related patents and application disclose the use of the Cassone Transducer for treating food for flavor enhancement. It is to that use that the current invention is directed.

Accordingly, there has been a need for novel acoustically-treated foods and a method for treating said foods to enhance their flavor. There is a further need for said foods and methods which do not use chemicals. There is a still further need for said foods and methods that enhance the flavor of food through the use of acoustic waves. There is an additional need for acoustically-treated foods and methods that can transform inferior quality and less expensive food into better tasting food. The present invention fulfills these needs and provides other related advantages.

SUMMARY OF THE INVENTION

The present invention resides in acoustically-treated foods for flavor enhancement and the methods therefor. The method begins with the placement of at least one transducer like the Cassone Transducer in a container containing water or other liquid. One or more foods, including beverages, may be positioned outside the container with the at least one transducer in the container. The food may be positioned outside the container within a range of about ¼ inch to about twenty feet from the liquid-containing container (i.e. within a so-called "sound energy field"), although flavor enhancement may be provided outside of this range as well as at any point within this range.

The food should be exposed to acoustic waves from the transducer at a frequency range between about 1 Hz to about 1000 Hz. Tests have indicated particularly good results obtained between about 400 Hz and about 800 Hz with optimal results obtained at about 600 Hz.

The food should be exposed to acoustic waves from the transducer for an effective period of time. Tests have indicated that flavor enhancement is provided by exposure for a period of time ranging from about one minute to about 24 hours, with better results provided by exposure for a period of time ranging from about one minute to about one hour. An exposure lasting about 30 minutes appears to provide optimal results.

In an alternative and preferred embodiment, the water or liquid within the container may itself be the food being treated for flavor enhancement with the at least one transducer immersed in the liquid food. Food may be acoustically-treated simultaneously with liquid food in the container and other food, including packaged liquid food outside the container.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
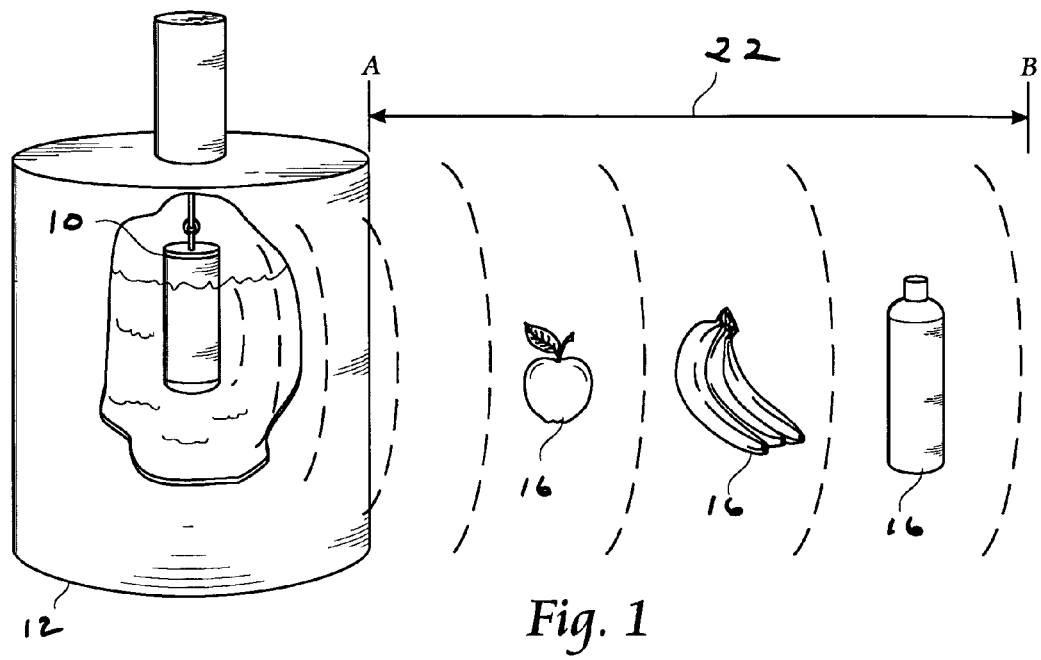
FIG. 1 is a perspective view of the practicing of the method of the present invention, with the positioning of exemplary food within a sound energy field near an electroacoustic transducer.

As shown in the drawings for purposes of illustration, the present invention is concerned with acoustically-treated foods and methods of acoustically treating the same for flavor enhancement. The method begins with the placement of at least one transducer 10 like the Cassone Transducer in a container 12 containing water or other liquid 14. One or more foods 16 may be positioned near the container 12 with the at least one transducer in the container. As used herein, "food" is any substance consumed by living organisms, including liquids. Such liquids include beverages and other liquid food. A beverage is a drink specifically prepared for human consumption. Beverages may include, but not be limited to, water, juice, soft drinks, sports drinks, dairy drinks, alcoholic beverages, nonalcoholic beverages, hot beverages, etc. Some other liquid foods, which may be eaten with a spoon or drunk, depending on the solid ingredients, how thick it is, and preference include soup, yogurt or the like. It is to be appreciated that the flavor of many types of food may be enhanced, and that this invention is not limited to any particular type of food.

The container 12 preferably has a volume ranging from one to five hundred gallons, with a volume of between five and fifty five gallons regarded as particularly preferred and a volume of approximately fifty gallons regarded as optimal. The volume of water or other liquid within the container is not particularly significant for effectiveness of the method. However, if the volume of water or other liquid within the container is greater than 500 gallons or to otherwise affect enhancement with lesser volumes, an acoustical array of more than one low frequency sonic transducer may be used as described in U.S. Pat. No. 5,132,942, incorporated herein by reference.

Figure 2:
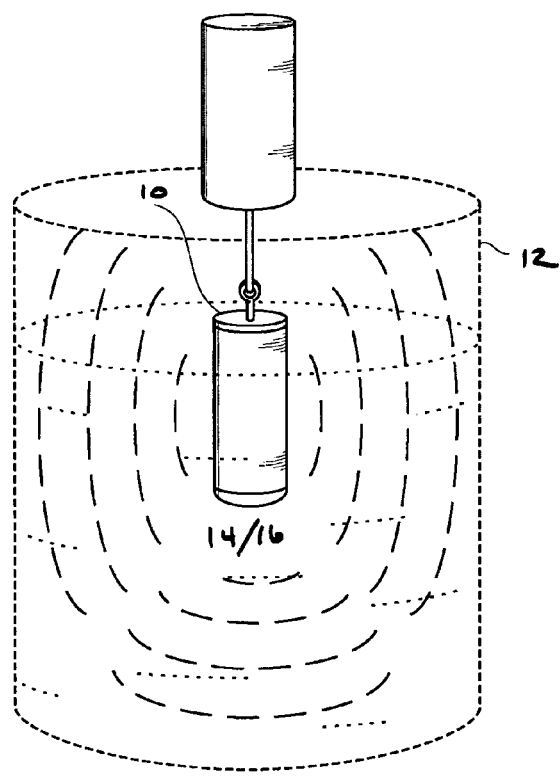
FIG. 2 is a perspective view of the practicing of another method of the present invention, with the positioning of the electroacoustic transducer in a liquid food.
Figure 3:
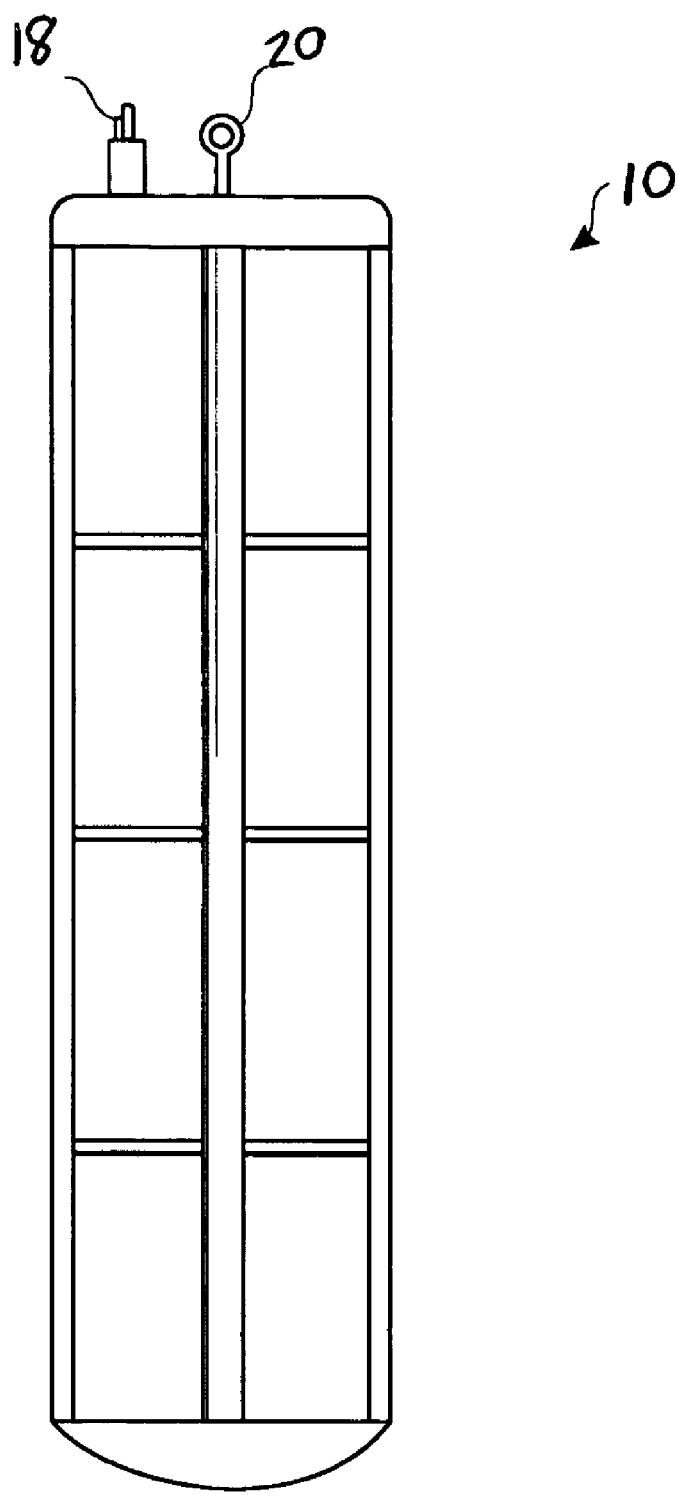
FIG. 3 is a side, cross-sectional view of an electroacoustic transducer of the type preferably used in the methods of the present invention.

Preferably, the transducer 10 may be the modified Cassone transducer as shown in FIG. 3 herein and FIG. 2 of U.S. Pat. No. 6,500,134. The modified Cassone transducer was modified slightly from the Cassone Transducer shown in U.S. Pat. No. 5,132,942 by the addition of a water-tight electrical connector 18 to replace the coaxial supply line and terminal shown in FIG. 2 of U.S. Pat. No. 5,132,942, and an eye-bolt 20 to replace the pair of lift members shown in FIG. 2 of U.S. Pat. No. 5,132,942. These modifications were intended to facilitate the dedicated use of the transducer in a liquid environment, with the water-tight electrical connector providing increased safety and the eye-bolt making it easier to remove the transducer from the container. While a modified Cassone Transducer as described herein is preferred for the transducer 10, any transducer capable of operating in a liquid environment and of generating acoustic waves at frequencies within the ranges described below would suffice.

Referring to FIG. 1, one or more foods 16 may be positioned near and outside the container 12 with the transducer in the container. A liquid food may be contained within a can, bottle or the like. The food may be positioned at any distance relative to the container 12 that is determined to be effective. Tests have indicated that flavor enhancement is provided within a range of about ¼ inch to about twenty feet from the container (i.e. within a so-called "sound energy field" 22), although flavor enhancement may be provided outside of this range as well as at any point within this range.

While FIG. 1 illustrates food positioned at different points to one side of the transducer 10, it should be noted that the transducer 10 is omni-directional, such that the food could be positioned on any side of the transducer 10 or two or more foods could be positioned on different sides of the transducer simultaneously.

The food should be exposed to acoustic waves from the transducer at a frequency between about 1 Hz to about 1000 Hz. Tests have indicated particularly good results obtained between about 400 Hz and about 800 Hz with optimal results obtained at about 600 Hz.

The food should be exposed to acoustic waves from the transducer 10 for an effective period of time. Tests have indicated that flavor enhancement is provided by exposure for a period of time ranging from about one minute to about 24 hours, with better results provided by exposure for a period of time ranging from about one minute to about one hour. An exposure lasting about 30 minutes appears to provide optimal results.

In an alternative embodiment as shown in FIG. 2, the water or other liquid within the container may itself be the food 16 being treated for flavor enhancement with the transducer immersed in the liquid food. The liquid food may be exposed to the acoustic waves from the transducer at the same effective frequencies, and for the same effective periods of time as described above with respect to the first embodiment. This approach may be particularly suitable to treat the liquid food prior to canning or bottling operations. This approach is preferred as the liquid food is closer to the source of the acoustic waves, without any container between the source of the waves and the liquid food. An acoustical array of more than one transducer may be used if necessary because of the volume of liquid food within the container or to otherwise affect effectiveness. It is to be noted that the at least one transducer may be immersed in liquid food within the container and one or more foods may be positioned outside the container within the sound energy field 22.

The method of the present invention has been tested on a variety of foods with tasters reporting significant flavor enhancement. For example, the method has been tested on bottles and/or cans of wine, Perrier® sparkling water, water, milk, orange juice, and fruit including oranges, grapes, and bananas. These foods were reported as having improved taste and texture after treatment by the methods described above. For example, pieces of fruit were tasted before and after treatment. The tasters reported that the fruit was sweeter after treatment. As another example, the bitterness from cheap wine seemed to be substantially removed after treatment. The wine and fruit also appeared to last longer than usual after treatment.

From the foregoing, it is to be appreciated that the acoustically-treated foods of the present invention have enhanced flavors and that the methods of the present invention safely provides such enhanced flavor without the use of chemicals. By the use of such methods, the flavor of inferior quality food may be easily and safely enhanced with the ability to treat large volumes of food simultaneously.

Although a particular embodiment of the invention has been described in detail for purposes of illustration, various modifications may be made without departing from the spirit and scope of the invention. Accordingly, the invention is not to be limited, except as by the appended claims.

I claim:

1. A method of treating food for flavor enhancement comprising the steps of:
    providing at least one low frequency sonic transducer, wherein said transducer having a water-tight electrical connector;
    immersing said at least one low frequency sonic transducer in a liquid-containing container, said liquid-containing container having a volume of approximately 5-50 gallons;
    positioning food within a sound energy field located outside of the liquid-containing container and at a distance ranging between approximately ¼ inch to approximately 20 feet outside from said liquid-containing container;
    exposing said food positioned within the sound energy field to acoustic waves that are within the sound energy field and that are emitted from said at least one low frequency sonic transducer at a frequency ranging only between about 1 Hertz to about 1000 Hertz; and
    enhancing flavor of the food by exposing the food to the acoustic wave, wherein the foods are chemically free of treatment.

2. The method of claim 1, wherein said frequency ranges between about 400 Hertz to about 800 Hertz.

3. The method of claim 2, wherein said frequency is about 600 Hertz.

4. The method of claim 1, wherein said food has been exposed to said acoustic waves for a period of time ranging between about one minute to about 24 hours.

5. The method of claim 4, wherein said food has been exposed to said acoustic waves for a period of time about 30 minutes.

6. A method of treating food for flavor enhancement comprising the steps of:
- providing at least one low frequency sonic transducer having a water-tight electrical connector;
- positioning said at least one low frequency sonic transducer within a liquid-containing container;
- positioning food within a sound energy field located outside of the liquid-containing container and between approximately ¼ inch to approximately 20 feet from said liquid-containing container;
- exposing said food to acoustic waves from said at least one low frequency sonic transducer at a frequency between approximately 400 Hertz to approximately 800 Hertz;
- exposing said food to said acoustic waves from said at least one low frequency sonic transducer for a period of time ranging between approximately one minute to approximately 24 hours; and
- enhancing flavor of the food by exposing the food to the acoustic wave, wherein the foods are chemically free of treatment.

* * * * *